United States Patent [19]
Fuma et al.

[11] Patent Number: 5,331,617
[45] Date of Patent: Jul. 19, 1994

[54] AUDIO DATA RECORDING/REPRODUCTION DEVICE HAVING DIGITAL HIGH SPEED DUBBING FUNCTION AND AUDIO DATA DUBBING SYSTEM USING SUCH DEVICES

[75] Inventors: Masato Fuma, Ichinomiya; Yutaka Tamura; Nagatoshi Sugihara, both of Gifu; Takao Inoue, Matsudo; Miyuki Okamoto, Hashima, all of Japan

[73] Assignee: Sanyo Electric Co., Ltd., Osaka, Japan

[21] Appl. No.: 68,004

[22] Filed: May 27, 1993

[30] Foreign Application Priority Data

May 29, 1992 [JP] Japan ................................ 4-138702

[51] Int. Cl.⁵ ............................................. G11B 7/00
[52] U.S. Cl. ......................................... 369/54; 369/84
[58] Field of Search .......................... 369/13, 47-48, 369/50, 53, 54, 58, 84, 124; 360/15

[56] References Cited

U.S. PATENT DOCUMENTS

| | | | |
|---|---|---|---|
| 5,126,993 | 6/1992 | Yokota | 369/54 X |
| 5,191,573 | 3/1993 | Hair | 369/84 |
| 5,255,250 | 10/1993 | Dewolf et al. | 369/84 X |
| 5,267,094 | 11/1993 | Aoki | 360/15 X |

*Primary Examiner*—W. R. Young
*Attorney, Agent, or Firm*—Peter L. Michaelson

[57] ABSTRACT

An audio data dubbing system includes a reproduction side device and a recording side device. The reproduction side device reproduces intermittently from a reproduction side disc compressed audio data on the basis of a predetermined reproducing unit, which is first stored in a reproduction side memory and read out continuously therefrom to be provided as compressed audio data for recording. Recording side device first stores in a recording side memory compressed audio data for recording provided from the reproduction side device and reads out the same therefrom intermittently in a predetermined recording unit to be recorded on a recording side disc. The recording side device suspends the reproduction operation of compressed audio data from the reproduction side disc in the reproduction side device when the data amount in the recording side memory is increased to exceed a first reference value. The reproduction side device suspends the recording operation of the compressed audio data for recording to the recording side disc in the recording side device when the data amount in the reproduction side memory is decreased to become lower than a second reference value.

19 Claims, 6 Drawing Sheets

AUDIO DATA RECORDING/REPRODUCTION DEVICE HAVING DIGITAL HIGH SPEED DUBBING FUNCTION AND AUDIO DATA DUBBING SYSTEM USING SUCH DEVICES

BACKGROUND OF THE INVENTION

1. Field of the Invention

The present invention relates to audio data recording/reproduction devices, and more particularly, to an audio data recording/reproduction device that can carry out digital high speed dubbing of audio data using an optical recording medium or a magneto-optical recording medium, and an audio data dubbing system using such devices.

2. Description of the Background Art

In recent years, a system is proposed such as the commonly called minidisc system that records compressed audio data intermittently on a disc using the magneto-optical recording principle. In the recording device of such a minidisc system, audio data of approximately 2 seconds of each channel provided from an audio signal source are digitalized and data-compressed to, for example 1/5, to be stored in a memory. When compressed audio data of a predetermined recording unit (1 cluster=36 sectors: here 1 sector is 2332 bytes) are stored in the memory, recording of compressed audio data to the disc is carried out.

In accordance with such a recording method using a memory, recording of compressed audio data to a disc is carried out intermittently with compressed audio data of 1 cluster as the recording unit. Therefore, even if there is a tracking error of the head due to vibration and the, like during recording to result in recording failure of compressed audio data to a disc, the recording operation of the compressed audio data can be carried out again before the start of recording operation of compressed audio data in the next recording unit. Therefore, drop out or termination of recorded data due to recording error can be prevented.

In a device that reproduces compressed audio data from a disc having digital compressed audio data recorded therein using the optical recording principle or the magneto-optical recording principle, a method is proposed in which compressed audio data reproduced intermittently from a disc is first stored in a memory and then sequentially read out therefrom to carry out continuous reproduction of compressed audio data.

According to such a reproduction method using a memory, reproduction of audio data from a disc is carried out intermittently. Therefore, even if reproduction of compressed audio data from a disc fails due to a tracking error of the head by vibration during reproduction or due to a scratch on the surface of the disc, drop out or termination of reproduced data due to reproduction failure can be prevented by sequentially reading out compressed audio data continuously which have already been stored in a memory and by carrying out again the reproduction operation of the compressed audio data before the start of reproduction operation of the next compressed audio data. Such a recording/reproduction device of a minidisc system is disclosed in a copending U.S. patent application Ser. No. 964,787 assigned to the same assignee of the present application.

A method of carrying out high speed dubbing of digital audio data using 2 units of disc recording/reproduction devices is proposed. Such a method is disclosed, for example, in a copending U.S. patent application Ser. No. 876,365 assigned to the same assignee of the present application. In brief, this method is implemented where audio data recorded on a disc of the reproduction side is read out by a disc reproduction device at the reproduction side using an optical pickup. The read out audio data is subjected to a predetermined decoding process and provided to a disc recording device at the recording side. The provided reproduced audio data is subjected to a predetermined encoding process in the disc recording device at the recording side and then recorded on a disc of the recording side by a head.

In the above-described dubbing method, the digital audio data reproduced from the disc of the reproduction side is provided to the device at the recording side without being stored in a memory. Therefore, if data reproduction fails due to tracking error caused by vibration or due to a scratch on the surface of the disc in the device at the reproduction side, the data not reproduced can no longer be recorded on the disc of the recording side. Furthermore, because the data for recording is recorded on a disc without being first stored in the memory at the recording side, if recording fails due to tracking error at the recording side even when reproduction of data at the reproduction side is possible, the data can no longer be recorded on the disc of the recording side.

Such problems of the conventional proposed dubbing method can be solved as follows when a dubbing system is implemented using the above-described minidisc system. More specifically, even when reproduction of audio data fails in the device at the reproduction side, the reproduction operation can be carried out again as mentioned above, wherein the reproduced audio data obtained by the re-reproduction operation is provided to the device at the recording side to be recorded on a disc thereof. Thus, proper dubbing with no interruption of audio data can be carried out continuously. Furthermore, even when recording of audio data fails at the device of the recording side, the recording operation can be carried out again, so that proper dubbing with no terminated audio data can be carried out continuously.

However, the above-described system using a minidisc generates the following problems when reproduction fails continuously in the device at the reproduction side or when recording fails continuously in the device at the recording side. For example, consider a case where recording of audio data to a disc is prevented continuously by some cause in the device at the recording side while reproduction of audio data is continuously carried out properly in the device at the reproduction side. Because provision of audio data from the device at the reproduction side to the device at the recording side and storage of the audio data to the memory in the device at the recording side are continued, the memory in the device at the recording side will eventually overflow.

Considering a contrary case where reproduction of audio data from a disc is prevented by some unrestorable cause such as scratch of a disc in the device at the reproduction side, the recording operation of data to a disc in the recording side device can never be carried out even though the recording side device retains a standby state of the recording operation, since the amount of supplied audio data for recording in the memory at the recording side never attain the predetermined recording unit.

Thus, a conventional dubbing system using a disc recording/reproduction device had the problem that proper dubbing could not be carried out since audio data to be recorded to the disc of the recording side is dropped or the recording operation never start when a reproduction disable state at the reproduction side or a recording disable state at the recording side continues.

SUMMARY OF THE INVENTION

In view of the foregoing, an object of the present invention is to provide a disc recording device that can prevent recording data from being dropped even when a recording disable state continues in the device at the recording side.

Another object of the present invention is to provide a disc reproduction device that can cancel the dubbing operation itself when a reproduction disable state continues for a certain period in the device at the reproduction side.

A further object of the present invention is to provide an audio data dubbing system that can prevent audio data to be recorded from being dropped or cancel the dubbing operation itself when a reproduction disable state at the reproduction side or a recording disable state at the recording side continues.

Briefly stated, the present invention relates to a disc recording device used in an audio data dubbing system. The audio data dubbing system includes a disc reproduction device for reproducing intermittently from a disc at the reproduction side compressed audio data on the basis of a predetermined reproducing unit to be stored temporarily in a memory at the reproduction side and then reading out the stored data continuously therefrom to be provided as compressed audio data for recording, and a disc recording device. The disc recording device includes a memory at the recording side, a data amount detecting circuit, a record unit, a control circuit for carrying out again a recording operation, and a circuit for suspending the reproduction operation in the disc reproduction device. The memory at the recording side stores compressed audio data for recording provided from the disc reproduction device. The data amount detecting circuit detects the amount of data in the memory at the recording side. The record unit responds to an output of the data amount detecting circuit to read out compressed audio data for recording from the memory at the recording side for recording the same intermittently in a disc at the recording side when the data amount in the memory at the recording side reaches a predetermined recording unit. The control circuit detects failure of recording of compressed audio data for recording to the disc at the recording side and carries out again the recording operation. The reproduction operation suspending circuit responds to an output of the data amount detecting circuit to suspend the reproduction operation of compressed audio data from the disc at the reproduction side in the disc reproduction device when the data amount in the memory at the recording side increases to exceed a reference value that is greater than the predetermined recording unit and smaller than the capacity of the memory at the recording side.

According to another aspect of the present invention, a disc reproduction device used in an audio data dubbing system includes a reproduction unit, a memory at the reproduction side, a data amount detecting circuit, a data read out circuit, a control circuit for carrying out again a reproduction operation, and a circuit for suspending the recording operation in the device at the recording side. The reproduction unit reproduces intermittently compressed audio data from a disc at the reproduction side on the basis of a predetermined reproducing unit. The memory at the reproduction side stores the compressed audio data reproduced intermittently. The data amount detecting circuit detects the amount of data in the memory at the reproduction side. The data read out circuit continuously reads out compressed audio data from the memory at the reproduction side to provide the same as compressed audio data for recording. The circuit detects failure of reproduction of compressed audio data from the disc at the reproduction side to carry out again the reproduction operation. The recording operation suspending circuit responds to an output of the data amount detecting circuit for suspending the recording operation of compressed audio data for recording to the disc at the recording side in the disc recording device when the data amount in the memory at the reproduction side is reduced to become less than a reference value that is lower than the capacity of the memory of the reproduction side by more than the predetermined unit.

According to a further aspect of the present invention, an audio data dubbing system includes a disc reproduction device and a disc recording device. The disc reproduction device includes a circuit for reproducing intermittently compressed audio data from the disc at the reproduction side on the basis of a predetermined reproducing unit, a memory at the reproduction side for storing the compressed audio data reproduced intermittently, a first data amount detecting circuit for detecting the amount of data in the memory at the reproduction device, a circuit for reading out continuously compressed audio data from the memory at the reproduction side to provide the same as compressed audio data for recording, and a circuit for detecting failure of reproduction of compressed audio data from the disc at the reproduction side to carry out again the reproduction operation. The disc recording device includes a memory at the recording side for storing compressed audio data for recording provided from the disc reproduction device, a second data amount detecting circuit for detecting the amount of data in the memory at the recording side, a circuit responsive to an output of the second data amount detecting circuit for reading out compressed audio data for recording from the memory of the recording side and recording intermittently in a disc at the recording side when the data amount in the memory at the recording side reaches the predetermined recording unit, a circuit for detecting failure of recording of compressed audio data for recording to the disc at the recording side for carrying out again the recording operation, and a circuit responsive to an output of the second data amount detecting circuit for suspending the reproduction operation of compressed audio data from the disc at the reproduction side in the disc reproduction device when the data amount in the memory at the recording side increases and exceeds a first reference value that is greater than the predetermined recording unit and smaller than the capacity of the memory at the recording side. The disc reproduction device further includes a circuit responsive to an output of the first data amount detecting circuit for suspending the recording operation of compressed audio data for recording to the disc at the recording side in the disc recording device when the data amount in the memory at the reproduction side is reduced to become less than a second reference value that is lower than the capacity of the reproduction side memory by more than, the predetermined unit.

According to still another aspect of the present invention, an audio data dubbing system includes a circuit for reproducing intermittently compressed audio data from the disc at the reproduction side on the basis of a predetermined reproducing unit, a memory for storing compressed audio data reproduced intermittently, a circuit for detecting the amount of data in the memory, a circuit responsive to an output of the data amount detecting circuit for reading out the compressed audio data from the memory and recording intermittently in the disc at the recording side when the data amount in the memory reaches a predetermined recording unit, a circuit to detect failure of recording of compressed audio data to the disc at the recording side for carrying out again the recording operation, a circuit to detect failure of reproduction of compressed audio data from the disc at the reproduction side for carrying out again the reproduction operation, a circuit responsive to an output of the data amount detecting circuit for suspending the reproduction operation of the compressed audio data from the disc at the reproduction side when the data amount in the memory increases to exceed a reference value that is greater than the predetermined recording unit and smaller than the capacity of the memory, and a circuit responsive to an output of the data amount detecting circuit for suspending the recording operation of compressed audio data to the disc of the recording side when detection is made that data amount in the memory is reduced to become lower than the predetermined unit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

FIRST EMBODIMENT

Figure 1:
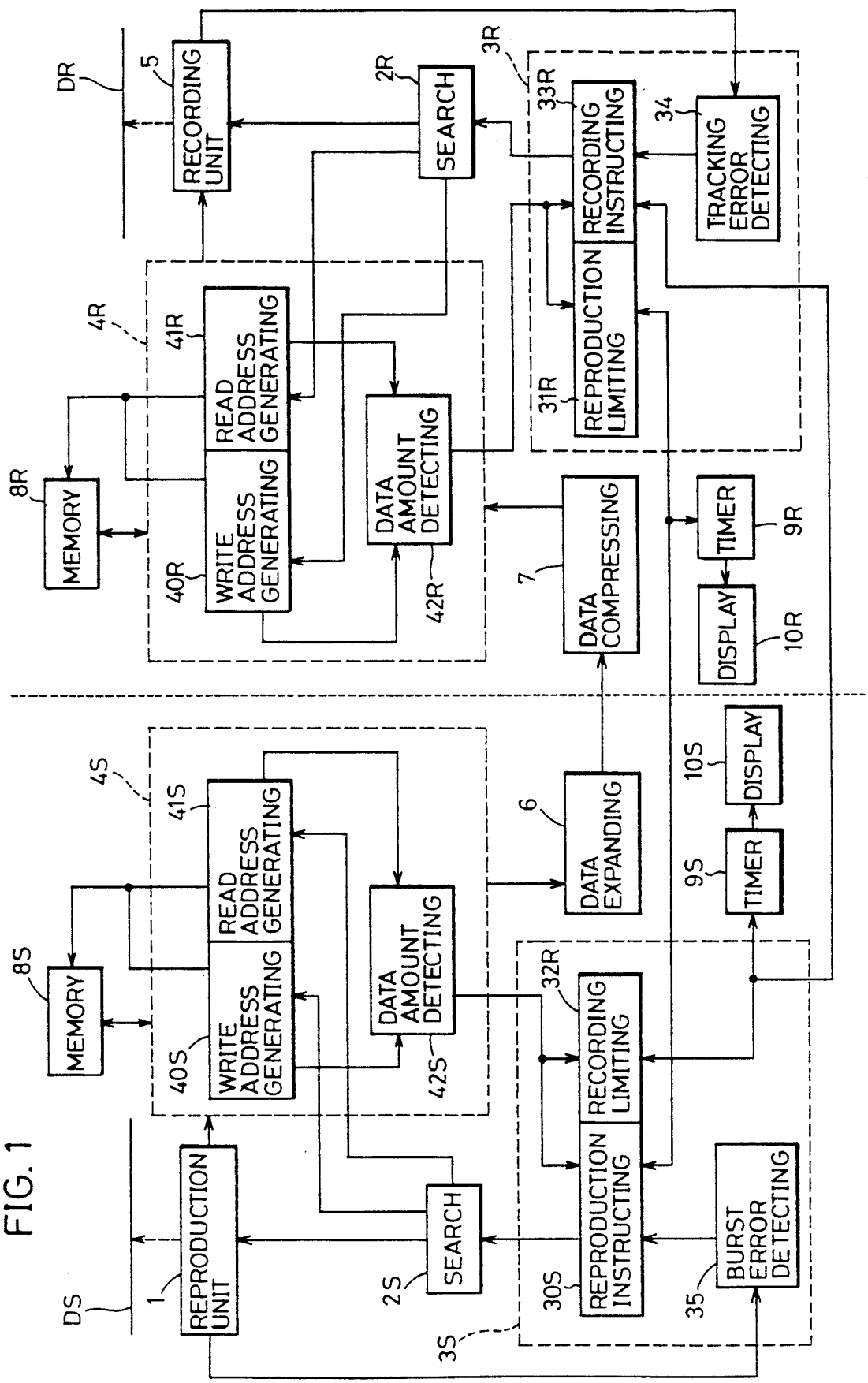
FIG. 1 is a block diagram schematically showing a structure of an audio data dubbing system according to a first embodiment of the present invention.

FIG. 1 is a block diagram schematically showing a structure of an audio data dubbing system according to a first embodiment of the present invention.

Referring to FIG. 1, the audio data dubbing system includes a first disc recording/reproduction device shown in the left side of the drawing with the center dotted line as the boundary, and a second disc recording/reproduction device shown in the right side of the drawing. The first disc recording/reproduction device functions as a reproduction device, and the second disc recording/reproduction device functions as a recording device. The structure and operation of an audio data dubbing system in normal operation will first be described with reference to FIG. 1.

[Normal Operation of Reproduction Side Device]

The reproduction side device of the present embodiment may be a disc recording/reproduction device that allows recording and reproduction using the magneto-optical recording and reproduction principle, or a read-only disc reproduction device according to an optical reproduction method.

When a user operates a play key in an operation unit not shown in the reproduction side device, a reproduction instructing circuit 30S in a system controller 3S in the reproduction side device generates and provides to a search circuit 2S a reproduction instruction. In response, search circuit 2S provides a reproduction unit driving signal to a reproduction unit 1, a write address generating instruction to a write address generating circuit 40S in a memory control circuit 4S, and a read address generating instruction to a read address generating circuit 41S in memory control circuit 4S.

It is assumed that reproduction unit 1 includes an optical pickup (not shown) for detecting optically data recorded on a reproduction side disc DS, a servo circuit (not shown) for controlling the movement of the optical pickup to move the optical pickup to a desired track position on a disc, and a CD-DA decoder (not shown) for applying a predetermined decode process to the data read out by the optical pickup.

Reproduction unit 1 receives a reproduction unit driving signal from search circuit 2S to drive the optical pickup (not shown) to reproduce the compressed audio data from reproduction side disc DS, to apply a predetermined decode process to the reproduced data by a CD-DA decoder (not shown), and to provide the same as reproduced audio data.

The reproduced audio data provided from reproduction unit 1 is stored in a memory 8S under the control of memory control circuit 4S. More specifically, write address generating circuit 40S in memory control circuit 4S is driven by a write address generating instruction from the aforementioned search circuit 2S to sequentially generate a write address, whereby the reproduced audio data is recorded in memory 8S according to the generated write address. Read address generating circuit 41S in memory control circuit 4S is driven by a read address generating instruction from search circuit 2S to generate sequentially a read address, whereby the reproduced audio data stored in memory 8S is read out from memory 8S according to the generated read address. The amount of data stored in memory 8S is detected by a data amount detecting circuit 42S according to comparison of a write address and a read address. The result is provided to reproduction instructing circuit 30S.

Figure 2:
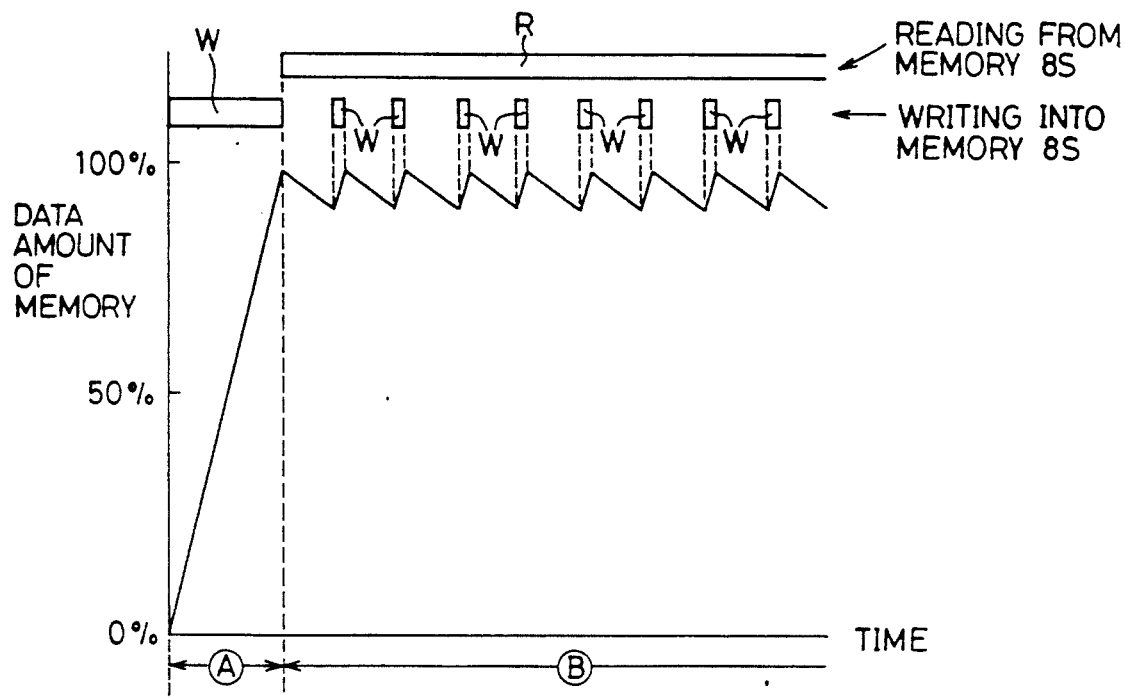
FIG. 2 is a graph showing the time transition of the data amount in the reproduction side memory shown in FIG.

FIG. 2 is a graph showing the time transition of the data amount in memory 8S as well as timing of write-/read of memory 8S in normal operation, where time is plotted along the abscissa, and the ratio of the data amount to the capacity of memory 8S (%) is plotted along the ordinate. Referring to FIG. 2, at the beginning of the reproduction operation, data is continuously reproduced and stored during the period Ⓐ until memory 8S is full. When memory 8S becomes full of data, writing of data is once stopped and continuous reading of data is initiated (during the period Ⓑ). Then, when detection is made by data amount detecting circuit 42S that data has been read out from the memory 8S until there are more than 2 sectors (1 sector is 2332 bytes) of space in the memory capacity, reproduction instructing circuit 30S responds to this detection result by sending a reproduction instruction to search circuit 2S. As a result, reproduction unit 1 receives a driving signal from search circuit 2S to reproduce compressed audio data on the basis of 2 sectors from reproduction side disc DS to provide the same to memory 8S. By reading out data continuously from memory 8S during the period Ⓑ and repeating intermittently such reproduction of data from disc DS and writing of data into memory 8S, the data amount in memory 8S changes as shown in FIG. 2. Therefore, even if a single reproduction error occurs, the reproduction can be carried out again because sufficient reproduced data is stored in memory 8S.

The compressed audio data read out from memory 8S is provided to a data expanding circuit 6 to be expanded by approximately 5 times. The expanded data is provided as output audio data. At the time of normal reproduction besides dubbing, the output audio data is converted into analog data by a D/A converter to be provided to a speaker. Because the present embodiment relates to dubbing, illustration and description of portions not related to dubbing will not be given.

[Normal Operation of Recording Side Device]

A recording operation of audio data reproduced by a reproduction side device as described above into a recording side disc DR by a recording side device will be described with reference to FIG. 1. The recording device of the present embodiment employs a disc recording device capable of at least recording using the magneto-optical recording principle.

In normal recording operation other than dubbing, an audio signal received through a microphone or the like is digitalized by an A/D converter to be recorded. Because the present embodiment relates to dubbing as mentioned before, illustration and description of portions not relating to dubbing will not be given.

Digital audio data provided from data expanding circuit 6 of the reproduction side device is transmitted to a data compressing circuit 7 of the recording side device. Although transmission of audio data is generally carried out in the form of a digital signal using an optical signal and the like, the audio data may be converted into an analog audio signal and then transmitted if necessary.

Data compressing circuit 7 compresses the applied digital audio data to approximately 1/5 and provides the same to a recording side memory 8R as compressed audio data for recording. This data is stored on the basis of 1 sound group (1 sound group is 424 bytes; the abovedescribed 2 sectors correspond to 11 sound groups) in memory 8R under the control of memory control circuit 4R.

More specifically, when audio data is supplied to the recording side device from the reproduction side device, a recording instructing circuit 33R of a system controller 3R generates and provides to a search circuit 2R a recording instruction. In response, search circuit 2R provides a write address generating instruction to write address generating circuit 40R and a record unit driving signal to a record unit 5.

It is assumed that record unit 5 includes a CD-ROM encoder (not shown) and a CD-DA encoder (not shown) for carrying out a predetermined encoding process to the audio data to be recorded, and an optical pickup (not shown) and a magnetic head (not shown) for recording data on a recording side disc DR.

Write address generating circuit 40R in memory control circuit 4R is driven by a write address generating instruction from search circuit 2R to sequentially generate a write address, whereby the audio data to be recorded is recorded in memory 8R according to the generated write address. The data amount stored in memory 8R is detected by a data amount detecting circuit 42R according to a comparison between a write address and a read address. The result is provided to a recording instructing circuit 33R.

Figure 3:
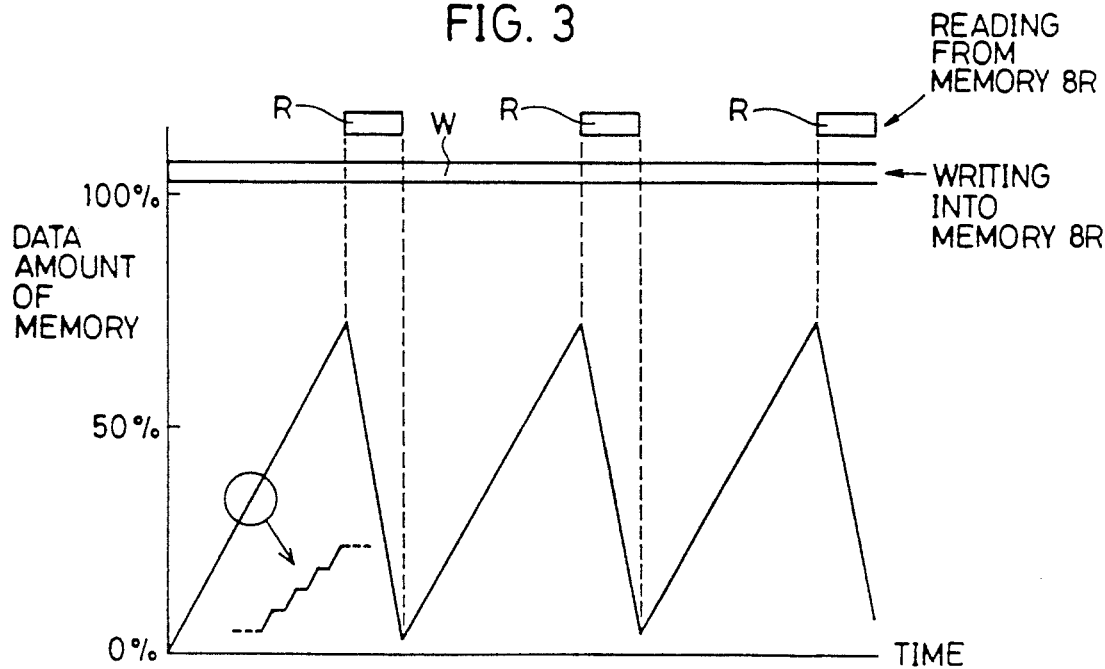
FIG. 3 is a graph showing the time transition of the data amount in the recording side memory shown in FIG. 1

FIG. 3 is a graph showing the time transition of data in memory 8R as well as timing of write/read of memory 8R, where time is plotted along the abscissa, and the ratio (%) of the data amount to the memory capacity is plotted along the ordinate. Referring to FIG. 3, audio data is stored in memory 8R continuously in the recording operation. Since such recording is actually carried out by continuously writing data on the basis of 1 sound group, the data amount in memory 8R increases in the stepped manner as enlarged in FIG. 3. When detection is made by data amount detecting circuit 42R that data has been stored up to a predetermined recording unit, i.e. 1 cluster 6.36 sectors), recording instructing circuit 33R provides a recording instruction to search circuit 2R. As a result, search circuit 2R provides a read address generating instruction to read address generating circuit 41R. In response, read address generating circuit 41R sequentially generates a read address, whereby the recording audio data of 1 cluster stored in memory 8R is read out according to the generated read address and provided to record unit 5. At the same time, search circuit 2R provides a record unit driving signal to record unit 5. In response, record unit 5 applies a predetermined encoding process to the audio data read out from memory 8R and records the same on a predetermined track position in the recording side disc DR using an optical pickup (not shown) and a magnetic head (not shown). By continuously recording data to memory 8R and repeating intermittently reading of data from memory 8R and recording of data to a recording side disc DR, the amount of data in memory 8R changes as shown in FIG. 3.

[Operation When Recording is Disabled in Recording Side Device]

An operation according to the present invention will be described in the case where an error occurs in the dubbing operation at the recording side. At the time of recording audio data to the recording side disc DR in the recording side device, a failure of data recording due to a tracking error caused by external vibration or the like is detected by system controller 3R according to a tracking error signal provided from a servo circuit (not shown) included in record unit 5. A tracking error signal indicates whether an optical pickup (not shown) of record unit 5 is properly directed to the center position of a track on a disc. Because an optical pickup can not be directed to the center position of a track when vibration is applied to the optical pickup as mentioned above, the amplitude thereof will indicate a great change in such a case. A tracking error detecting circuit 34 in system controller 3R continuously monitors this tracking error signal to determine that recording fails when the amplitude shows a great change during a recording operation. In this case, tracking error detecting circuit 34 controls record instructing circuit 33R to instruct search circuit 2R to retry the recording operation. Such retry of recording operation can be repeated until recording is enabled.

Figure 4:
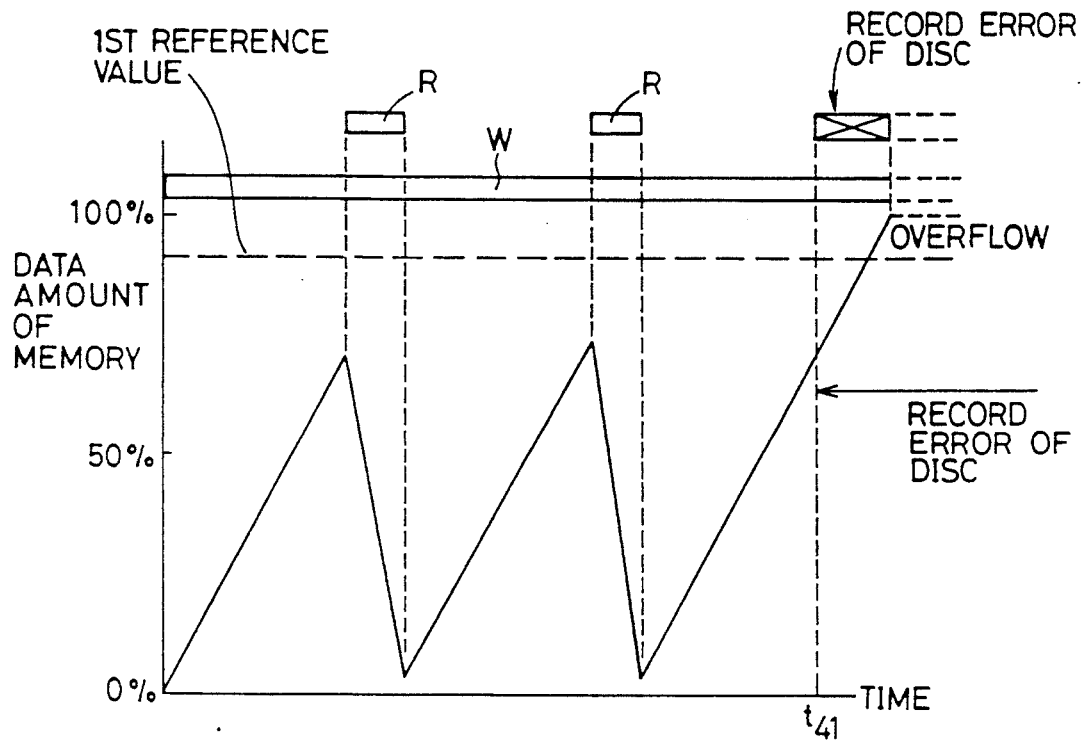
FIG. 4 is a graph showing the time transition of the data amount in the recording side memory according to an embodiment of the present invention.

If normal reproduction operation is continued at the reproduction side device during the retry of such recording, the data amount in the recording side memory 8R will constantly be increased. FIG. 4 is a graph showing the time transition of the data amount in recording side memory 8R in such a state. When a recording operation fails at time t41 in FIG. 4, a recording is retried. During this retry, audio data for recording is continuously provided from the reproduction side device. Therefore, the data amount in recording side memory 8R continuously increases to exceed 1 cluster, and eventually attains an overflow state as shown by the broken line. As a result, audio data to be recorded will be lost.

In the first embodiment of the present invention, a first reference value is set (for example 90% of the memory capacity) that is smaller than the capacity of recording side memory 8R. When detection is made by data amount detecting circuit 42R that the data amount in the memory has exceeded the first reference value, a reproduction limiting circuit 31R in recording side system controller 3R generates a reproduction suspending instruction which is provided to a reproduction instructing circuit 30S in system controller 3S of the reproduction side device. Upon receiving this reproduction suspending instruction, reproduction instructing circuit 30S temporarily cancels the reproduction instruction to reproduction side search circuit 2S, whereby the optical pickup (not shown) of reproduction unit 1 temporarily attains a reproduction standby state. Search circuit 2S also temporarily cancels the read address generating instruction to read address generating circuit 41S. This causes the read out of reproduced audio data from reproduction side memory 8S to be temporarily suspended. As a result, the amount of data in recording side memory 8R is maintained at the first reference value during the temporary suspension of the reproduction device as indicated by the solid line in FIG. 4. Therefore, loss of recording audio data caused by overflow can be avoided. The first reference value is set to an appropriate value greater than the data amount (1 cluster) stored in recording side memory 8R during a normal recording operation.

When the re-recording succeeds and detection is made by data amount detecting circuit 42R that the data amount in recording side memory 8R becomes lower than the first reference value, the reproduction suspending instruction by reproduction limiting circuit 31R is canceled. Because the stored contents in reproduction side memory 8S is maintained during the temporary suspension in this case, provision of reproduced audio data to the recording side device is immediately reinitiated when the reproduction suspension instruction is canceled.

Although reproduction limiting circuit 31R is provided in system controller 3R at the recording side in the embodiment of FIG. 1, the reproduction limiting circuit may be provided in system controller 3S at the reproduction side. In this case, a structure is implemented so as to provide the output of data amount detecting circuit 42R at the recording side to the reproduction limiting circuit provided in the reproduction side device.

When reproduction limiting circuit 31R at the recording side generates a reproduction suspending instruction described above, a timer circuit 9R is driven, whereby the time is counted until the reproduction suspending instruction is canceled. The counted result is provided to reproduction limiting circuit 31R sequentially. When the counted time exceeds a predetermined time period, reproduction limiting circuit 31R cancels the dubbing operation itself. Also, a display device 10R is driven to notify the user that dubbing is canceled. A maximum number of times to retry a recording in the case of recording failure may be determined in advance, and the above-mentioned predetermined time period may be set to the time required for retrying recording that number of times. Also, a structure may be implemented in which dubbing is canceled immediately when the data amount in recording side memory 8R exceeds the above-described first reference value.

[Operation When Reproduction is Disabled in Reproduction Side Device]

An operation of the present invention will be described when dubbing operation error occurs at the reproduction side. At the time of reproducing audio data from reproduction side disc DS in the reproduction side device, reproduction failure of data due to external vibration or a scratch on the surface of the disc is detected by system controller 3S according to the frequency of burst error detected during the decoding process of a CD-DA decoder (not shown) included in reproduction unit 1. Burst error occurs when read out error is generated over several bits in the reproduced data. A burst error detecting circuit 35 in system controller 3S monitors the generation of a burst error. When determination is made by burst error detecting circuit 35 that normal reproduction operation is not carried out according to the frequency of burst error generation, detecting circuit 35 controls reproduction instructing circuit 30S to instruct search circuit 2S to retry the reproduction operation.

Figure 5:
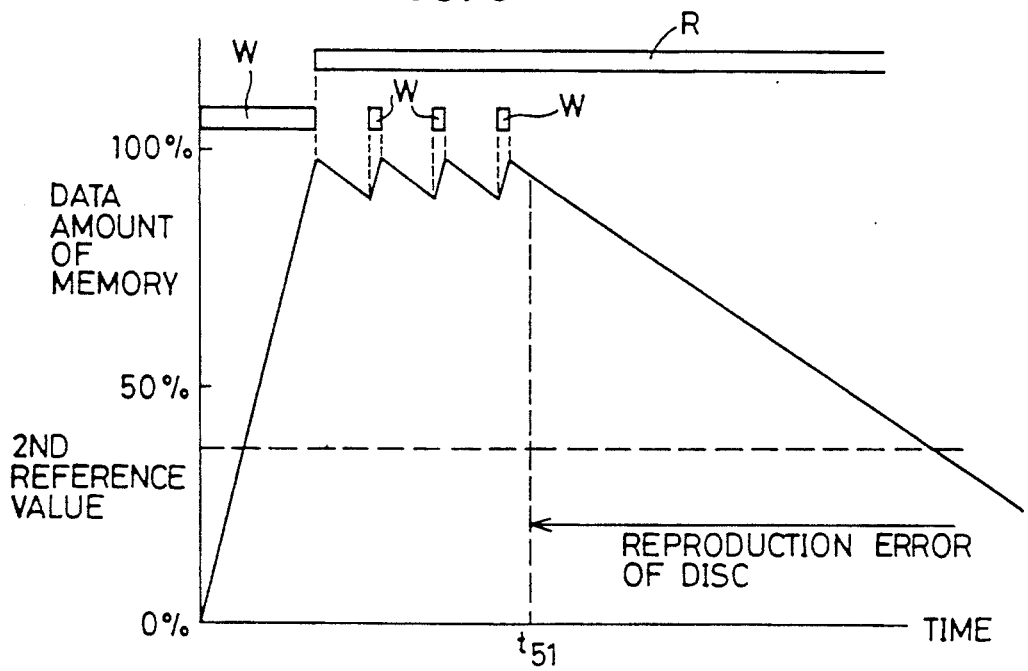
FIG. 5 is a graph showing the time transition of the data amount in the reproduction side memory according to an embodiment of the present invention.

If normal recording operation is continuously carried out at the recording side device during such trial of re-reproduction, the amount of data in reproduction side memory 8S will be reduced continuously. FIG. 5 is a graph showing the time transition of the data amount in reproduction side memory 8S in such a state. When reproduction fails at time t51 in FIG. 5, audio data for recording will be continuously provided from the reproduction side device to the recording side device during the retry of reproduction. The amount of data in memory 8S will be continuously reduced to eventually become empty. This means that the audio data for recording is terminated.

As a result, data of all zero (silent data) is provided from the reproduction side device to the recording side device. If any proper measures are not taken, therefore, the silent data will be recorded on the recording side device.

In other words, since the reproduction side device is unable to determine by itself whether the audio data for recording has been terminated, the silent data (or the last data immediately before termination of the audio data for recording) is recorded as it is, resulting in the formation of silent portion on the recording side disc.

According to the first embodiment of the present invention, a second reference value (for example 40% of the memory capacity) is set of a level where the amount of data in memory 8S should normally not be reduced to become less than that value. When detection is made by data amount detecting circuit 42S that the data amount in memory 8S has been reduced to become lower than the second reference value, a record limiting circuit 32R in system controller 3S generates a recording suspending instruction to provide the same to record instructing circuit 33R in system controller 3R in the recording side device. Upon receiving a recording suspending instruction, record instructing circuit 33R temporarily cancels a record instruction to search circuit 2R to set record unit 5 to a standby state temporarily. Also, search circuit 2R temporarily cancels a read address generating instruction to read address generating circuit 41R. As a result, reading of recording audio data from memory 8R is temporarily suspended. Thus, recording of silent data into the recording side disc is avoided.

When the retry of succeeds and detection is made by data amount detecting circuit 42S that the data amount in reproduction side memory 8S exceeds the second reference value by continuation of a normal reproduction operation, the record suspending instruction by record limiting circuit 32R is canceled.

According to the present embodiment, the recording side device is temporarily suspended when data in a certain area in the reproduction disc can not be reproduced. The reproduction is retried by an unlimited number of times until that data is reproduced. Therefore, record unit 5 will not proceed to a recording operation how much the time takes for the repeated trial. Accordingly, the formation of the silent portion on the recording side disc can be prevented.

Although record limiting circuit 32R is provided in system controller 3S at the reproduction side in the embodiment of FIG. 1, the record limiting circuit may be provided in system controller 3R at the recording side. In this case, a structure is implemented so that the output of data amount detecting circuit 42S at the reproduction side is sent to the record limiting circuit provided in the recording side device.

When record limiting circuit 32R at the reproduction side generates the above-described recording suspending instruction, a timer circuit 9S at the reproduction side is driven to measure the time until the record suspending instruction is canceled. The result is applied sequentially to record limiting circuit 32R. When the measured time exceeds a predetermined time period, record limiting circuit 32R cancels the dubbing operation. Also, display device 10S is driven to notify the user that the dubbing operation has been canceled. A maximum number of times for trying the re-reproduction in the case of reproduction failure may be predetermined in advance, and the above-described predetermined time may be set to the time required for trying the re-reproduction for this number of times. Also, a structure may be implemented so that dubbing is immediately canceled when the data amount of the reproduction side memory 8S becomes lower than the second value.

EMBODIMENT 2

Figure 6:
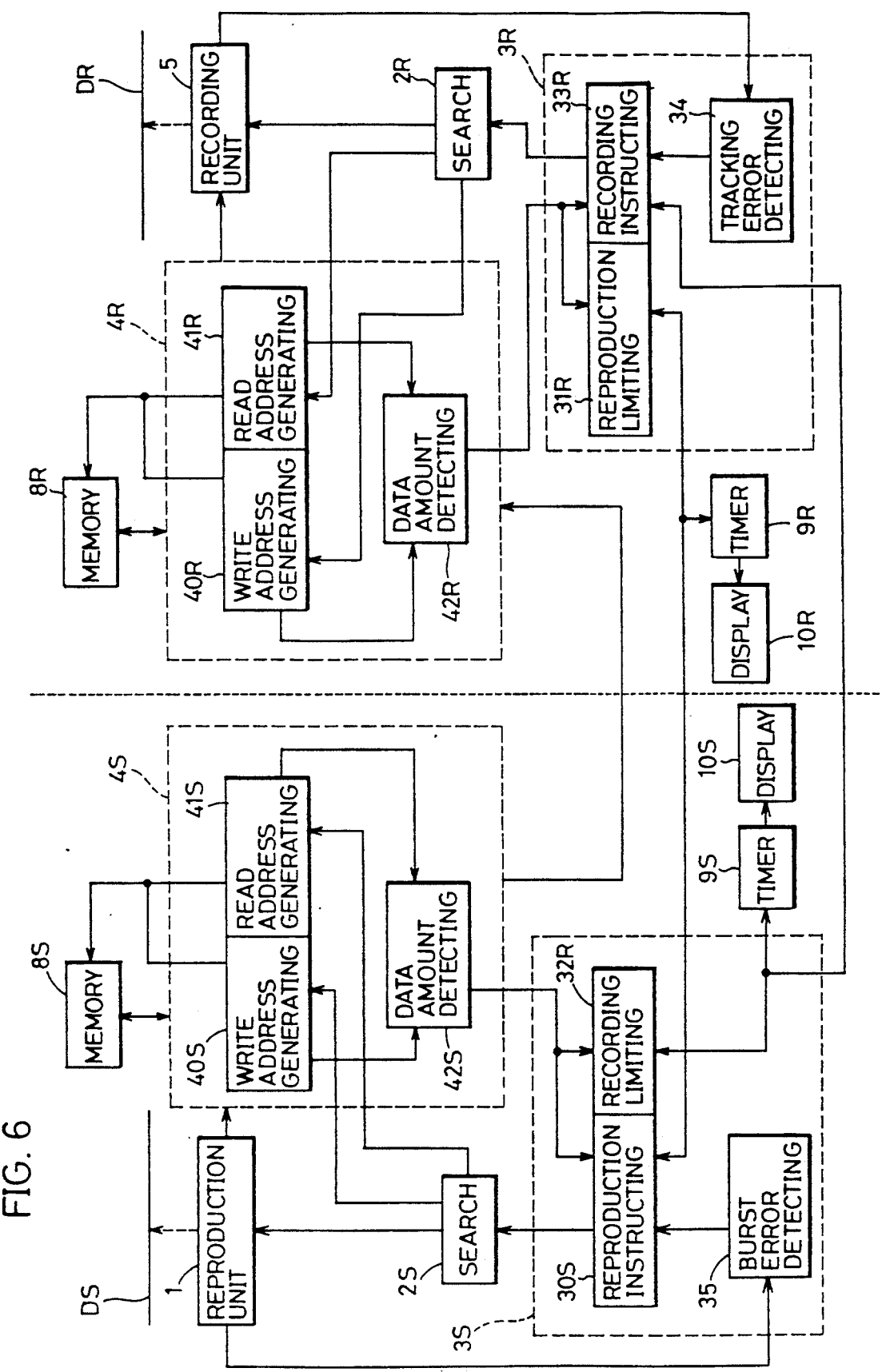
FIG. 6 is a block diagram schematically showing a structure of an audio data dubbing system according to a second embodiment of the present invention.

FIG. 6 is a block diagram schematically showing a structure an audio data dubbing system according to a second embodiment of the present invention. The second embodiment differs from the first embodiment shown in FIG. 1 in the points set forth in the following. Description of common portions will not be repeated.

In comparison with the above-described first embodiment where compressed audio data read out from reproduction side memory 8S is first data expanded by data expanding circuit 6 to be provided to the recording side device as output audio data, the second embodiment of FIG. 6 has the compressed audio data read out from reproduction side memory 8S directly provided to the recording side device without being expanded. Because data transfer from the reproduction side to the recording side is carried out with the data still compressed in the second embodiment, the time required for dubbing can be reduced to 1/5 in comparison with that of the first embodiment of FIG. 1. Also, because the data expanding circuit of the reproduction side and the data compressing circuit of the recording side are not required, the structure of the device can be simplified.

EMBODIMENT 3

Figure 7:
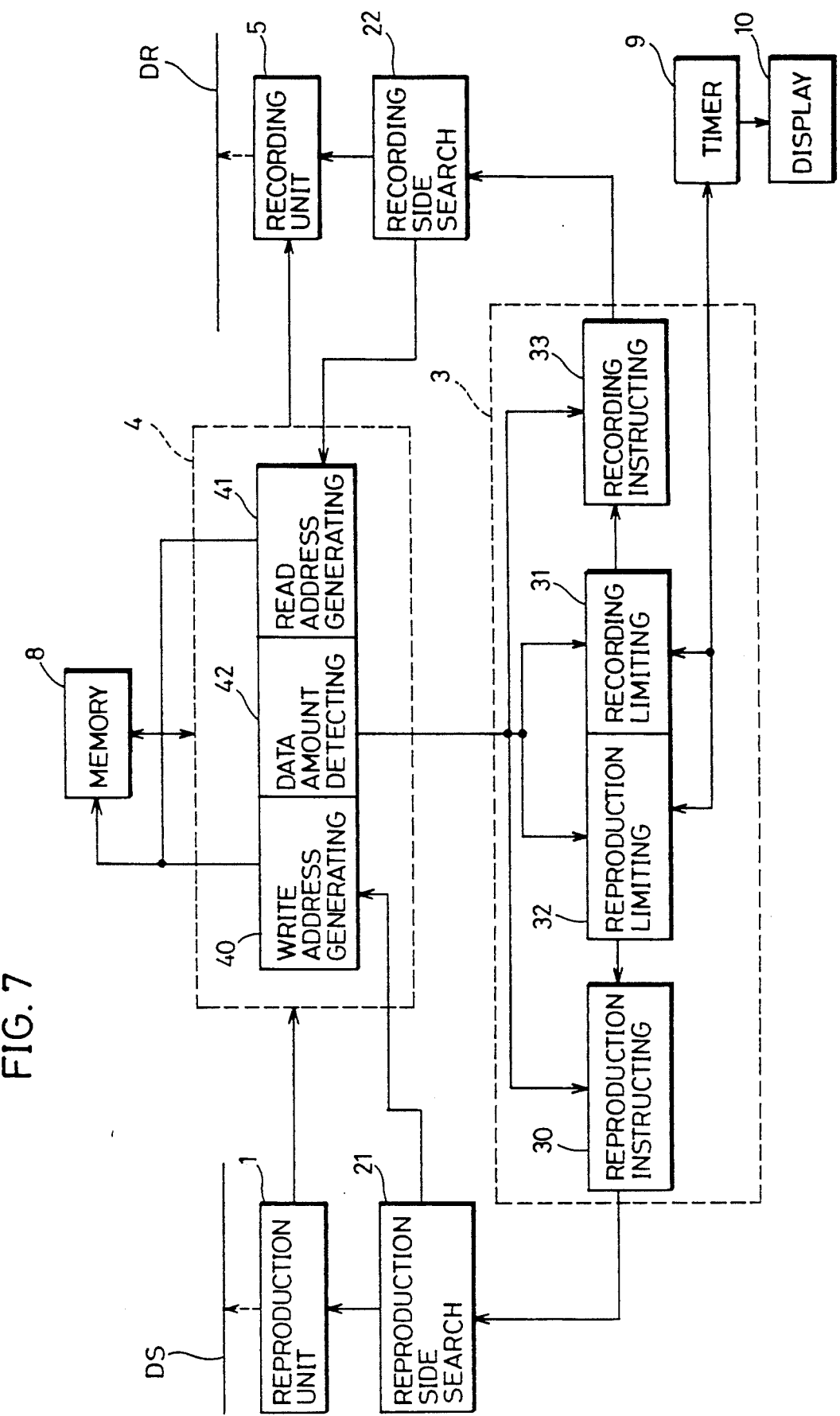
FIG. 7 is a block diagram schematically showing a structure of an audio data dubbing system according to a third embodiment of the present invention.
Figure 8:
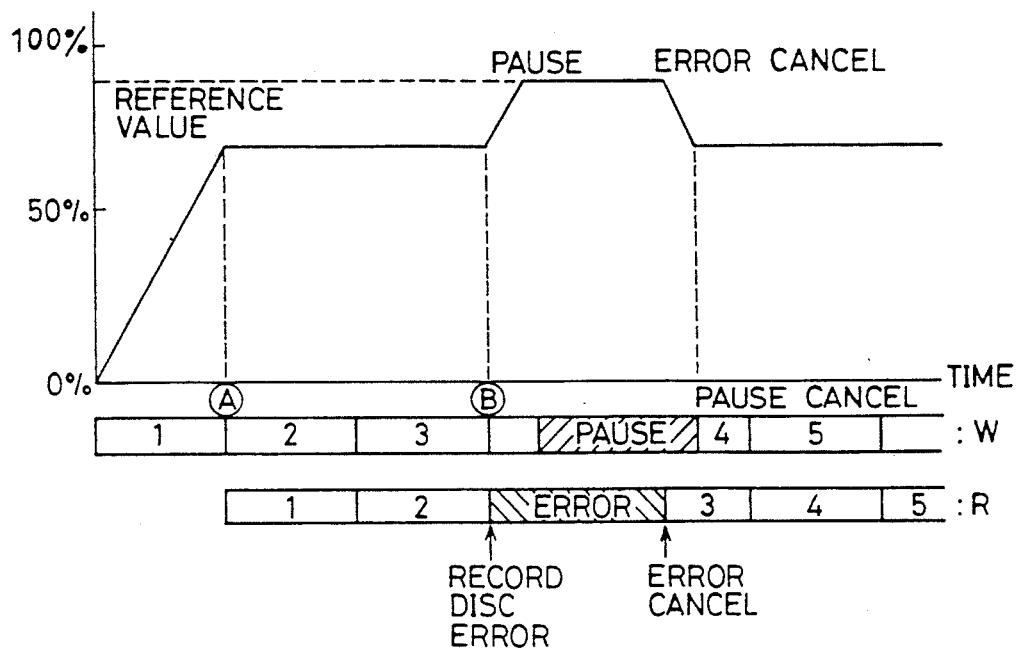
FIGS. 8 and 9 are graphs each showing the time transition of the data amount in the memory according to the third embodiment of the present invention.
Figure 9:
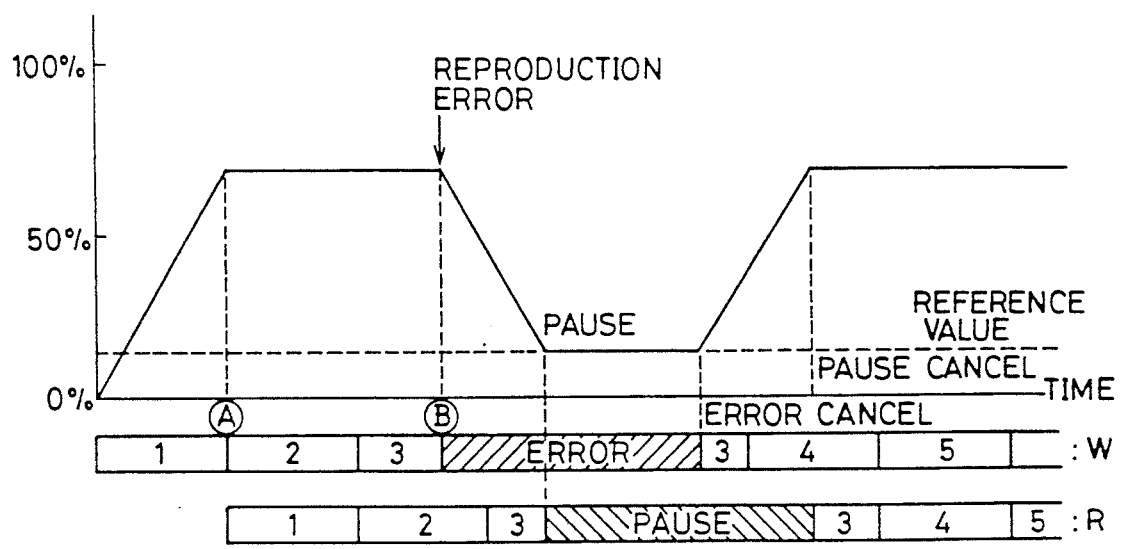

FIG. 7 is a block diagram schematically showing a structure of an audio data dubbing system according to a third embodiment of the present invention and FIGS. 8 and 9 are timing charts showing the operation of this embodiment. In comparison with the above-described first and second embodiments where memories are respectively provided in the reproduction side device and the recording side device, the third embodiment shown in FIG. 7 relates to an audio data dubbing system that carries out dubbing sharing one memory. A system of such a manner may include, for example, a W-minidisc system in which two disc recording-reproduction devices are integrated.

Referring to FIGS. 7–9, when a user operates a play key in an operation unit not shown at the initiation of dubbing, a reproduction instructing circuit 30 in a system controller 3 generates and provides to a recording side search circuit 21 a reproduction instruction. In response, search circuit 21 provides a reproduction unit driving signal to a reproduction unit 1, and a write address generating instruction to a write address generating circuit 40 in a memory control circuit 4.

Upon receiving a driving signal from search circuit 21, reproduction unit 1 reproduces audio data from a reproduction side disc DS which is provided to memory 8 under the control of memory control circuit 4. It is desirable that memory 8 has an address space divided into a reproduction side and a recording side for simplification of control operation. A circulate buffer may also be used instead of the memory having the divided address space.

Write address generating circuit 40 is driven by a write address generating instruction from search circuit 21 to sequentially generate a write address, whereby reproduced audio data provided from reproduction unit 1 is sequentially stored in memory 8 according to the generated storage address (FIGS. 8 and 9).

Simultaneous to the start of the dubbing operation, a record instructing circuit 33 in system controller 3 also is actuated to constantly monitor the output of data amount detecting circuit 42. When detection is made by data amount detecting circuit 42 that the data amount in memory 8 reaches 1 cluster (Ⓐ0 in FIGS. 8 and 9), record instructing circuit 33 generates and provides to a record side search circuit 22 a record instruction. It should also be noted that numerals along the axis of abscissa represent numbers of data on the cluster basis.

In response, search circuit 22 provides a record unit driving signal to record unit 5, and a read address generating instruction to a read address generating circuit 41. As a result, audio data of 1 cluster in memory 8 is continuously read out according to a read address generated from read address generating circuit 41. After the timing Ⓐ, writing rate from the reproduction side disc to memory 8 is substantially the same as reading rate from memory 8 to the recording side disc, and the data amount in memory 8 is maintained at the constant level (period Ⓐ to Ⓑ). The audio data read out from memory 8 is provided to record unit 5 as audio data for recording. Record unit 5 applies a predetermined process to the audio data to record the same on a recording disc DR.

The amount of data in memory 8 will continue to be increased if recording failure to the recording side disc occurs at timing Ⓑ in FIG. 8 and then continues. When detection is made by a data amount detecting circuit 42 that the data amount reaches the predetermined reference value shown in FIG. 8, reproduction limiting circuit 32 generates and provides to reproduction instructing circuit 30 a reproduction suspending instruction. In response, reproduction instructing circuit 30 controls reproduction side search circuit 21 to temporarily suspend the reproduction. As a result, reproduction of audio data from reproduction side disc DS is temporarily suspended during the retrial of the recording operation. Thus, data loss due to overflow in memory 8 can be prevented.

If the recording operation to the recording side disc is carried out normally but reproduction failure from the reproduction side disc occurs at Ⓑ in FIG. 9 and then continues, the amount of data in memory 8 will continue to be reduced, resulting in the failure of recording operation. In this case, if the data amount is reduced to be lower than the reference value to enter the underflow state, the recording operation is suspended (paused). The data amount in memory 8 will be maintained at a constant level during the pause period. If the reproduction disabled condition continues due to unrestorable cause, the dubbing system will enter the hung-up condition.

Record limiting circuit 31 constantly monitors the output of data amount detecting circuit 42. When detection is made that the data amount in memory 8 is maintained at a constant level over a time period required for reading out data of 2 sectors from the reproduction side disc, record limiting circuit 31 drives a timer circuit 9. When detection is made that the data amount in memory 8 is still maintained at the constant level when a predetermined time period elapses after the drive of timer circuit 9, record limiting circuit 31 generates and provides to recording instructing circuit 33 a record cancel instruction. Recording instructing circuit 33 controls search circuit 22 at the recording side to cancel a recording operation by record unit 5, and also cancel generation of a read address by read address generating circuit 41. As a result, the recording operation of audio data to a recording side disc DR is canceled.

The above-mentioned predetermined time period measured by timer circuit 9 may be set to various time periods such as the time required for recording data of 1 cluster, for example, onto a recording side disc.

Timer circuit 9 may be implemented to measure a predetermined time period starting from transmission of a reproduction suspending signal from reproduction limiting circuit 32. Specific operations therefor have already been described with reference to FIG. 1, and will not be repeated.

It is appreciated that various control operations in the above-described embodiments can be realized in a software manner using a microcomputer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disc recording device used in an audio data dubbing system, said audio data dubbing system including a disc reproduction device for reproducing intermittently from a reproduction side disc compressed audio data on the basis of a predetermined reproducing unit to be stored in a reproduction side memory and then reading out the stored data therefrom continuously to be provided as compressed audio data for recording, and said disc recording device, wherein said disc recording device comprises
  a recording side memory for recording said compressed audio data for recording provided from said disc reproduction device,
  means for detecting the data amount in said recording side memory,
  means responsive to an output of said data amount detecting means for reading out said compressed audio data for recording from said recording side memory and recording the read out data intermittently in a recording side disc when the data amount in said recording side memory reaches a predetermined recording unit,
  means for detecting failure of recording said compressed audio data for recording to said recording side disc for retry of a recording operation, and
  means responsive to an output of said data amount detecting means for suspending the reproduction operation of said compressed audio data from said reproduction side disc in said disc reproduction device when the data amount in said recording side memory increases to exceed a reference value that is greater than said predetermined recording unit and smaller than the capacity of said recording side memory.

2. The disc recording device according to claim 1, wherein said disc reproduction device forming said audio data dubbing system expands compressed audio data read out from said reproduction side memory to provide the expanded data to said disc recording device as audio data for recording,
  said disc recording device further comprising data compressing means for compressing said audio data for recording provided from said disc reproduction device.

3. The disc recording device according to claim 1, further comprising means for immediately canceling the dubbing operation itself when detection is made by said data amount detecting means that the data amount in said recording side memory has increased to exceed said reference value.

4. The disc recording device according to claim 1, further comprising means for canceling said suspension of the reproduction operation when detection is made by said data amount detecting means that the data amount in said recording side memory has reduced lower than said reference value after the reproduction operation of said compressed audio data from said reproduction side disc has been suspended.

5. The disc recording device according to claim 4, further comprising means for immediately cancelling the dubbing operation itself when suspension of a reproduction operation is not canceled even when a predetermined time period expires after said suspension of the reproduction operation.

6. The disc recording device according to claim 5, further comprising means for displaying cancelling of a dubbing operation to a user.

7. The disc recording device according to claim 1, wherein said disc recording device is a disc recording device using the magneto-optical recording principle.

8. A disc reproduction device used in an audio data dubbing system, said audio data dubbing system including said disc reproduction device, and a disc recording device for first storing into a recording side memory compressed audio data for recording provided from said disc reproduction device and reading out the stored data intermittently therefrom on the basis of a predetermined recording unit to be recorded in a recording side disc,
wherein said disc reproduction device comprises:
means for reproducing compressed audio data intermittently on the basis of a predetermined reproducing unit from said reproduction side disc,
a reproduction side memory for storing said intermittently reproduced compressed audio data,
means for detecting the data amount in said reproduction side memory,
means for reading out continuously said compressed audio data from said reproduction side memory to provide the read out data as said compressed audio data for recording,
means for detecting failure of reproduction of said compressed audio data from said reproduction side disc to retry the reproduction operation, and
means responsive to an output of said data amount detecting means for suspending the recording operation of said compressed audio data for recording to said recording side disc in said disc recording device when the data amount in said reproduction side memory is reduced to become less than a reference value that is lower than the capacity of said reproduction side memory by more than a predetermined unit.

9. The disc reproduction device according to claim 8, further comprising means for expanding said compressed audio data read out from said reproduction side memory and providing the read out data to said disc recording device as audio data for recording,
wherein said disc recording device further comprises data compressing means for compressing said audio data for recording provided from said disc reproduction device.

10. The disc reproduction device according to claim 8, further comprising means for immediately canceling the dubbing operation itself when detection is made by said data amount detecting means that the data amount of said reproduction side memory has been reduced lower than said reference value.

11. The disc reproduction device according to claim 8, further comprising means for canceling said suspension of the recording operation when detection is made by said data amount detecting means that the data amount in said reproduction side memory has increased greater than said reference value after the recording operation of said compressed audio data to said recording side disc has been suspended.

12. The disc reproduction device according to claim 11, further comprising means for immediately canceling a dubbing operation itself when the suspension of a recording operation is not canceled even when a predetermined time period expires after said suspension of the recording operation.

13. The disc reproduction device according to claim 12, further comprising means for displaying cancellation of a dubbing operation to a user.

14. The disc reproduction device according to claim 8, wherein said disc reproduction device is a disc reproduction device using the optical reproduction principle.

15. A disc reproduction device according to claim 8, wherein said disc reproduction device is a disc reproduction device using the magneto-optical recording and reproduction principle.

16. An audio data dubbing system, comprising:
a disc reproduction device, and
a disc recording device,
wherein said disc reproduction device includes:
means for reproducing intermittently from a reproduction side disc compressed audio data on the basis of a predetermined reproducing unit,
a reproduction side memory for storing said intermittently reproduced compressed audio data,
first data amount detecting means for detecting the data amount in said reproduction side memory,
means for reading out continuously said compressed audio data from said reproduction side memory to provide the read out data as compressed audio data for recording, and
means for detecting failure of reproduction of said compressed audio data from said reproduction side disc to retry the reproduction operation,
wherein said disc recording means includes:
recording side memory for storing said compressed audio data for recording provided from said disc reproduction device,
second data amount detecting means for detecting the data amount in said recording side memory,
means responsive to an output of said second data amount detecting means for reading out said compressed audio data for recording from said recording side memory and recording the read out data intermittently in a recording side disc when the data amount in said recording side memory reaches a predetermined recording unit,
means for detecting failure of recording of said compressed audio data for recording to said recording side disc to retry the recording operation, and
means responsive to an output of said second data amount detecting means for suspending the reproduction operation of said compressed audio data from said reproduction side disc in said disc reproduction device when the data amount in said recording side memory increases to exceed a first reference value that is greater than said predetermined recording unit and smaller than the capacity of said recording side memory, wherein said disc reproduction device further comprises means responsive to an output of said first data amount detecting means for suspending the recording operation of said compressed audio data for recording to said recording side disc in said disc recording device when the data amount in said reproduction side memory is reduced to become lower than a second reference value that is lower than the capacity of said reproduction side memory by more than a predetermined unit.

17. The audio data dubbing system according to claim 16, wherein said disc reproduction device comprises means for expanding said compressed audio data read out from said reproduction side memory to provide the expanded data to said disc recording device as audio data for recording, said disc recording device further comprises data compressing means for compressing said audio data for recording provided from said disc reproduction device.

18. An audio data dubbing system comprising:

means for reproducing intermittently from a reproduction side disc compressed audio data on the basis of a predetermined reproducing unit, memory for storing said intermittently reproduced compressed audio data, means for detecting the data amount in said memory, means responsive to an output of said data amount detecting means for reading out said compressed audio data from said memory and recording the read out data intermittently in a recording side disc when the data amount in said memory reaches a predetermined recording unit, means for detecting failure of recording of said compressed audio data to said recording side disc to retry the recording operation, means for detecting failure of reproduction of said compressed audio data from said reproduction side disc to retry the reproduction operation, means responsive to an output of said data amount detecting means for suspending the reproduction operation of said compressed audio data from said reproduction side disc when the data amount of said memory increases to exceed a reference value that is greater than said predetermined recording unit and smaller than the capacity of said memory, and means responsive to an output of said data amount detecting means for suspending the recording operation of said compressed audio data to said recording side disc when detection is made that the data amount in said memory is reduced to become lower than a predetermined unit.

19. The audio data dubbing system according to claim 18, further comprising means for immediately canceling the dubbing operation itself when suspension of a reproduction operation is not canceled even when a predetermined time period expires after said suspension of the reproduction operation.

* * * * *